(12) United States Patent
Robinson (10) Patent No.: US 8,511,607 B2
(45) Date of Patent: Aug. 20, 2013

(54) UAV LAUNCH ATTACHMENT ASSEMBLY AND LAUNCH SYSTEM

(75) Inventor: Andrew B. Robinson, Santa Rosa, CA (US)

(73) Assignee: Arcturus UAV LLC, Rohnert Park, CA (US)

( * ) Notice: Subject to any disclaimer, the term of this patent is extended or adjusted under 35 U.S.C. 154(b) by 308 days.

(21) Appl. No.: 12/836,496

(22) Filed: Jul. 14, 2010

(65) Prior Publication Data

US 2012/0012695 A1  Jan. 19, 2012

(51) Int. Cl.
*B64F 1/04* (2006.01)
(52) U.S. Cl.
USPC ............................................................ 244/63
(58) Field of Classification Search
USPC .............. 244/63, 49, 114 R, 190; 414/749.1, 414/792.2, 792.3, 495; 124/56, 59, 60, 79
See application file for complete search history.

(56) References Cited

U.S. PATENT DOCUMENTS

| | | | | |
|---|---|---|---|---|
| 2,706,102 | A * | 4/1955 | Cresci | 254/8 C |
| 4,079,901 | A | 3/1978 | Mayhew et al. | |
| 5,013,204 | A * | 5/1991 | Leon | 414/347 |
| 5,237,726 | A * | 8/1993 | Gartenmann et al. | 19/159 R |
| 5,490,758 | A * | 2/1996 | Stone | 414/792.3 |
| 5,695,153 | A | 12/1997 | Britton et al. | |
| 5,743,705 | A * | 4/1998 | Eissfeller | 414/749.1 |
| 6,112,858 | A * | 9/2000 | Arnst | 187/269 |
| 6,857,493 | B2 * | 2/2005 | Shupp et al. | 180/168 |
| 7,077,620 | B2 * | 7/2006 | Ishioka | 414/749.1 |
| 7,140,575 | B2 | 11/2006 | McGeer et al. | |
| 7,143,974 | B2 | 12/2006 | Roeseler et al. | |
| 7,165,745 | B2 | 1/2007 | McGeer et al. | |
| 7,210,654 | B1 | 5/2007 | Cox et al. | |
| 7,712,702 | B2 | 5/2010 | McGeer et al. | |
| 7,954,755 | B2 * | 6/2011 | Lipponen | 244/63 |
| 8,052,120 | B2 * | 11/2011 | Bacon | 254/93 HP |
| 2006/0086241 | A1 | 4/2006 | Miller et al. | |
| 2008/0093501 | A1 | 4/2008 | Miller et al. | |
| 2008/0203220 | A1 | 8/2008 | Hanzlick et al. | |

* cited by examiner

*Primary Examiner* — Rob Swiatek
*Assistant Examiner* — Valentina Xavier
(74) *Attorney, Agent, or Firm* — James F. Hann; Haynes Beffel & Wolfeld LLP (57) ABSTRACT

A UAV attachment assembly, used with a UAV launch assembly comprising a frame and a launch driver, comprises a base, a UAV support, a biasing element, a coupler, and a retainer. The base is operably coupled to the launch driver. The UAV support is mounted to the base and is placeable in vertically collapsed and vertically extended orientations. The biasing element biases the UAV support towards the collapsed orientation. The coupler releasably couples the UAV support to a UAV when the UAV support is in the extended orientation, the UAV support being free of the UAV when in the collapsed orientation. The retainer maintains the UAV support in the vertically extended orientation prior to launch and releases the UAV support at launch so that the biasing element can cause the UAV support to move towards the collapsed orientation and to disengage from the UAV.

13 Claims, 9 Drawing Sheets

UAV LAUNCH ATTACHMENT ASSEMBLY AND LAUNCH SYSTEM

BACKGROUND OF THE INVENTION

Unmanned aerial vehicles (UAVs), also known as remotely operated aircraft, are used for many different military and commercial applications, including reconnaissance; surveillance and security; communication relay; area mapping; monitoring erosion and environmental changes; agricultural, farming and commercial fishing purposes; fire detection and damage assessment; surveillance of borders, harbors and canals; convoy, road and population protection; and natural resources and wildlife management. Some UAVs are launched using pneumatic tube launchers to eliminate the need for long runways.

BRIEF SUMMARY OF THE INVENTION

The present invention is particularly useful for use with UAVs having push type propellers. One of the problems with push propeller type of UAVs is keeping the propeller from contacting the pushrod or other structure typically used to launch the UAV. This invention addresses this problem using a vertically retractable UAV attachment assembly which permits the fuselage of the UAV to be positioned away from the pushrod; but, soon after initiation of launch, it quickly disconnects from the UAV and moves out of the way of the spinning propeller of the UAV.

A first example of an unmanned aerial vehicle (UAV) attachment assembly is for use with a UAV launch assembly of the type comprising a frame and a launch driver supported by the frame. The launch driver is capable of generating a launching force along a launch path relative to the frame. The UAV attachment assembly comprises a base, a UAV support, a biasing element, a coupler, and a retainer. The base is operably coupled to the launch driver. The vertically retractable UAV support is mounted to the base and is placeable in a vertically collapsed orientation towards the base and a vertically extended orientation extending away from the base. The biasing element is coupled to the UAV support and biases the UAV support towards the collapsed orientation. The coupler releasably couples the UAV support to a UAV when the UAV support is in the extended orientation, the UAV support being free of the UAV when in the collapsed orientation. The retainer is operably coupled to at least one of the biasing element and the UAV support to maintain the UAV support in the vertically extended orientation prior to launch. The retainer releases the UAV support at launch so that the biasing element can cause the UAV support to move towards the collapsed orientation and to disengage from the UAV.

In some examples the UAV support comprises a scissors assembly, the scissors assembly comprising at least one pair of legs. Each pair of legs comprises first and second legs pivotally secured to one another at a pivot point located along the first and second legs. The legs have outer ends and base ends, the base ends being mounted to the base. The legs are movable between the vertically collapsed orientation towards the base and the vertically extended orientation extending away from the base. At least one of the base ends is mounted to the base for sliding movement along the base between a first state with the legs in the collapsed orientation, and a second state with the legs in the extended orientation. The coupler releasably attaches the outer ends of the legs to the UAV when the legs are in the extended orientation, the outer ends being free of the UAV when the legs are in the collapsed orientation. The biasing element is coupled to the legs and biases the legs towards the collapsed orientation.

One example of a method for launching an unmanned aerial vehicle (UAV) from a UAV launch assembly of the type comprising a frame and a launch driver supported by the frame, the launch driver being capable of generating a launching force along a launch path relative to the frame, comprises the following. A vertically retractable UAV attachment assembly is mounted to the launch assembly. The UAV attachment assembly comprises a base operably coupled to the launch driver and a vertically retractable UAV support mounted to the base and placeable in a vertically collapsed orientation towards the base and a vertically extended orientation extending away from the base. The UAV attachment assembly also comprises a biasing element coupled to the UAV support and biasing the UAV support towards the collapsed orientation. The UAV is mounted to the UAV support with the UAV support in the extended orientation so that the UAV support extends downwardly away from the UAV. The UAV support is maintained in the extended orientation prior to launch. The launch driver launches the UAV attachment assembly and the UAV therewith along the launch path away from the frame. At launch, the UAV support is disengaged from the UAV, and the UAV attachment assembly is moved vertically downwardly away from the UAV from the vertically extended orientation towards the vertically collapsed orientation.

In some examples, the UAV attachment assembly mounting step is carried out using a scissors type of UAV attachment assembly comprising at least one pair of legs with the legs of each said one pair pivotally secured to one another at pivot points. The UAV vertically downwardly moving step may be carried out using a spring operably coupled to the legs to move the UAV support towards the vertically collapsed orientation.

A second example of an unmanned aerial vehicle (UAV) launch system comprises a UAV, a UAV launch assembly, a UAV attachment assembly, and a retainer. The UAV launch assembly comprises a frame and a launch driver supported by the frame. The launch driver is capable of generating a launching force along a launch path relative to the frame. The UAV attachment assembly comprises a base and first and second legs. The base is operably coupled to the launch driver. The first and second legs are pivotally secured to one another at a pivot point located along the first and second legs. The first and second legs are movable about the pivot point between a collapsed orientation towards the base and an extended orientation extending away from the base. The first and second legs have outer ends and base ends, the base ends mounted to the base. At least one of the base ends is mounted to the base for sliding movement along the base between a first state with the legs in the collapsed orientation, and a second state with the legs in the extended orientation. A biasing element is coupled to the legs and biases the legs towards the collapsed orientation. The coupler releasably couples the outer ends of the legs to the UAV when in the extended orientation. The outer ends of the legs are free of the UAV when in the collapsed orientation. A retainer is operably coupled to the first and second legs to maintain the first and second legs in the extended orientation prior to launch and to release the first and second legs upon launch so that the biasing element can cause the legs to move towards the collapsed orientation and to disengage from the UAV.

In some examples, the UAV has a lower surface and a recess formed therein for receipt of the outer ends of the legs. The lower surface may constitute a skid plate.

A third example of an unmanned aerial vehicle (UAV) launch system comprises a UAV, a UAV launch assembly, and a UAV attachment assembly. The UAV has a fuselage and a push type propeller extending aft of the fuselage. The UAV launch assembly comprises a frame and a launch driver supported by the frame. The launch driver comprises an outer tube supported by the frame and an inner pushrod slideably mounted within the outer tube. The UAV attachment assembly comprises a base, a UAV support, a biasing element, and a retainer. The base is mounted to the pushrod. The UAV support is mounted to the base. The UAV support comprises a scissors assembly, the scissors assembly comprising at least one pair of legs. Each pair of legs comprises first and second legs pivotally secured to one another at a pivot point located along the first and second legs. The legs have outer ends and base ends. The legs are movable between the vertically collapsed orientation towards the base and the vertically extended orientation extending away from the base. The base ends are mounted to the base for sliding movement along the base between a first state with the at least one pair of legs in the collapsed orientation, and a second state with the at least one pair of legs in the extended orientation. The outer ends are releasably attachable to the UAV when the legs are in the extended orientation. The outer ends are free of the UAV when the legs are in the collapsed orientation. The biasing element is coupled to the legs and biases the legs towards the collapsed orientation. The retainer is operably coupled to the legs to maintain the legs in the extended orientation prior to launch, and to release the legs upon launch so that the biasing element can cause the legs to move towards the collapsed orientation and to disengage from the UAV.

Other features, aspects and advantages of the present invention can be seen on review the figures, the detailed description, and the claims which follow.

DETAILED DESCRIPTION OF THE INVENTION

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Figure 1:
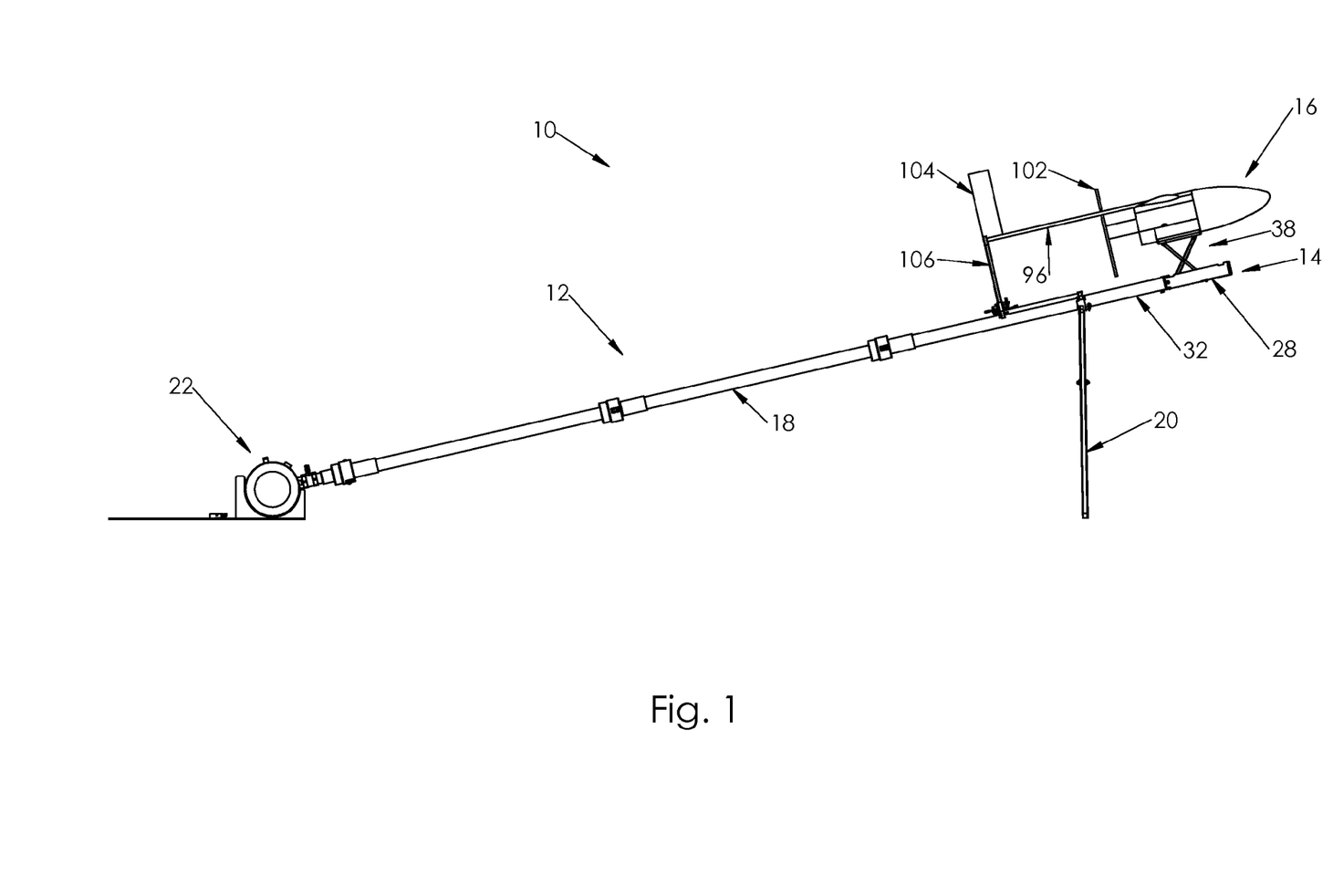
FIG. 1 is a side view of a UAV launch system, including a UAV and a UAV launch assembly, with a UAV attachment assembly made according to the invention.
Figure 1A:
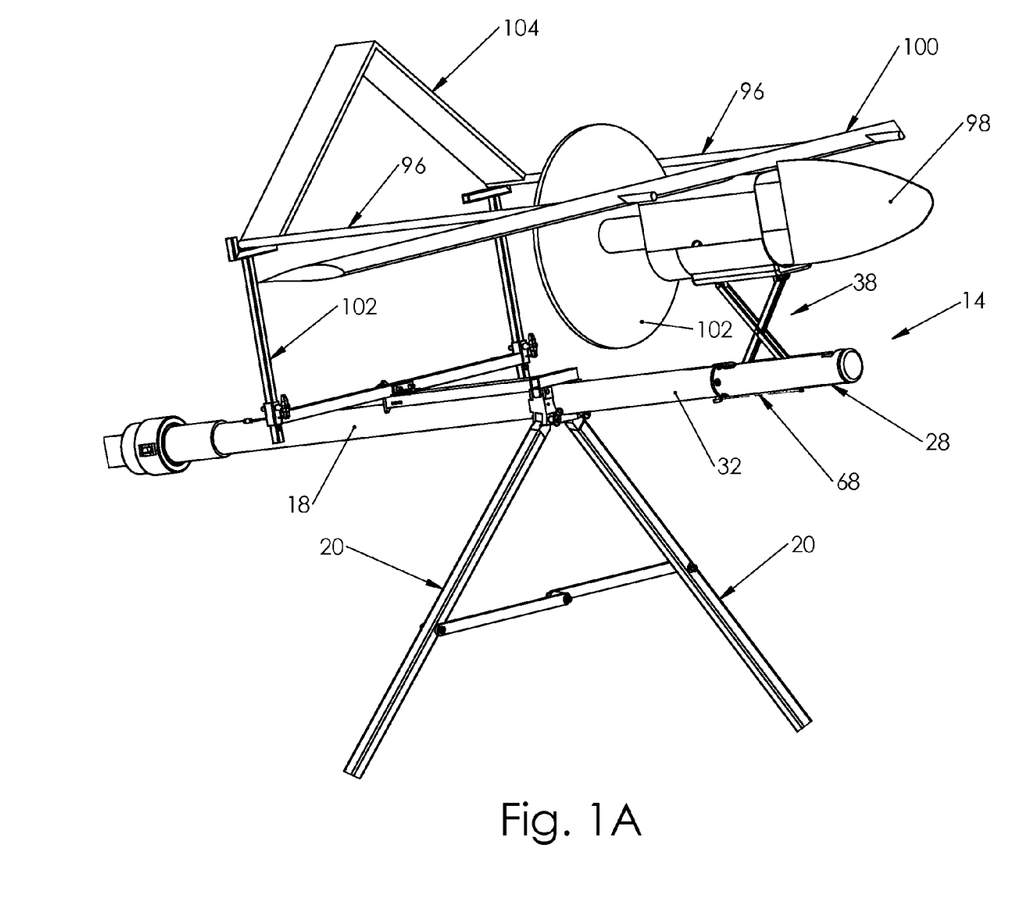
FIG. 1A is an enlarged overall view of a portion of FIG. 1.

FIGS. 1 and 1A illustrate a UAV launch system 10 including a UAV launch assembly 12, a UAV attachment assembly 14 and a UAV 16. UAV 16 is mounted to UAV attachment assembly 14 and is supported by UAV launch assembly 12. UAV launch assembly 12 may be a conventional pneumatic tube launcher including an outer tube 18 supported at its outer, elevated end by a pair of legs 20. The other end of outer tube 18 is connected to and supported by a pressurized air assembly 22. A pushrod 24, see FIGS. 2 and 3, is housed within outer tube 18.

Figure 2:
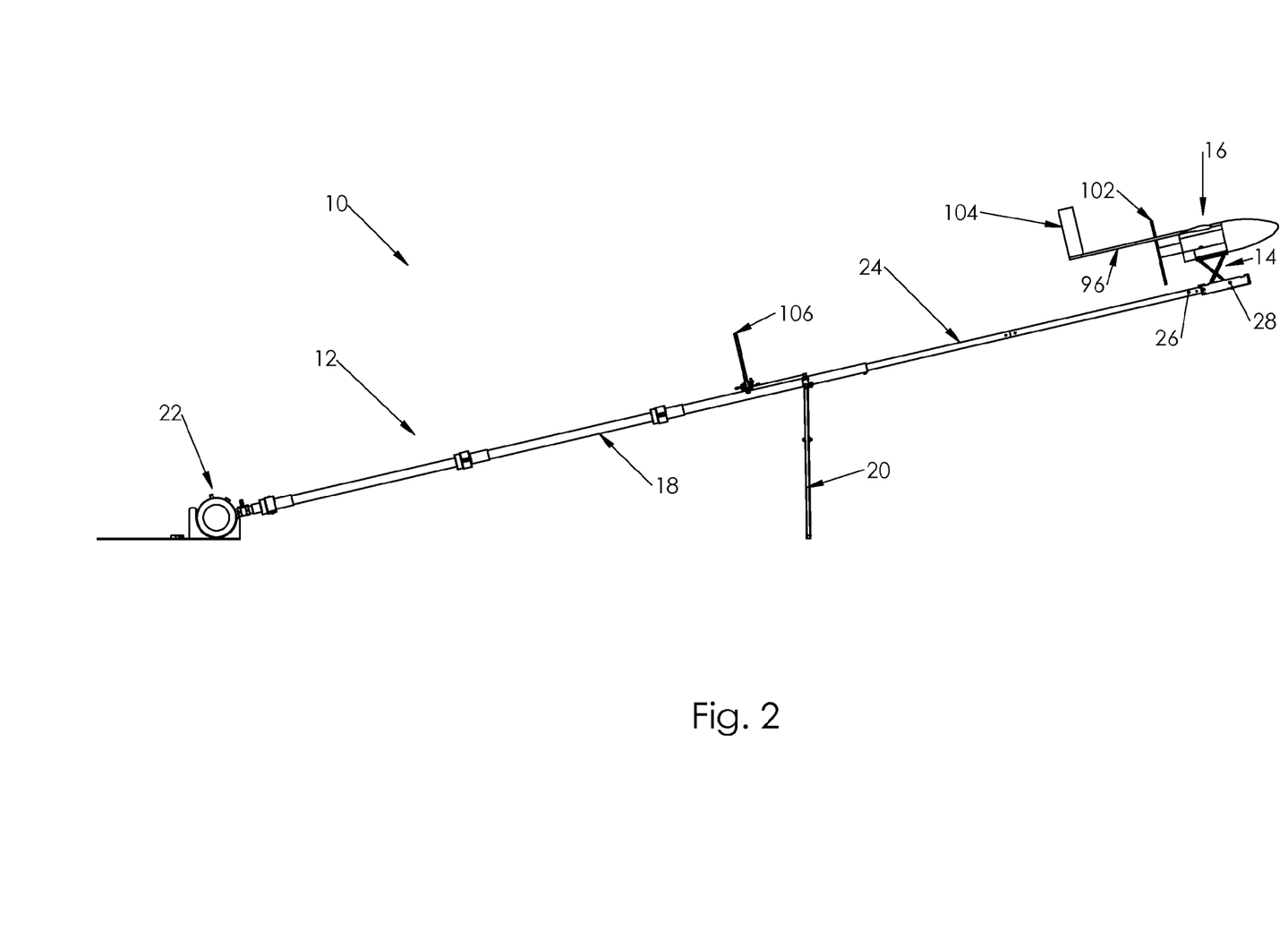
FIG. 2 is a side view of the system of FIG. 1 at the beginning of launch with the pushrod partially extended from the outer tube of the UAV launch assembly.
Figure 3:
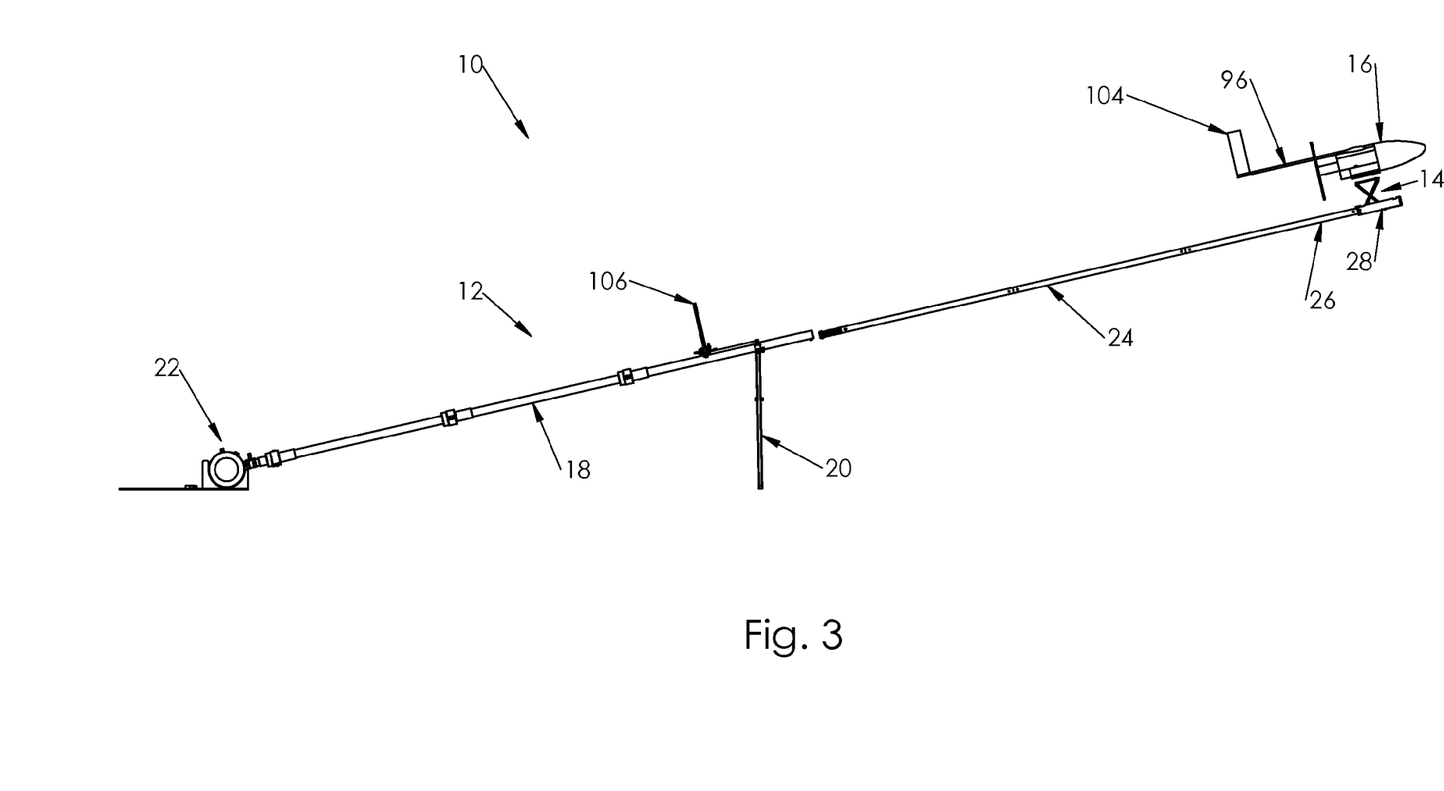
FIG. 3 shows the structure of FIG. 2 after the pushrod has cleared the end of the outer tube and the UAV attachment assembly has become disengaged from the UAV.
Figure 4:
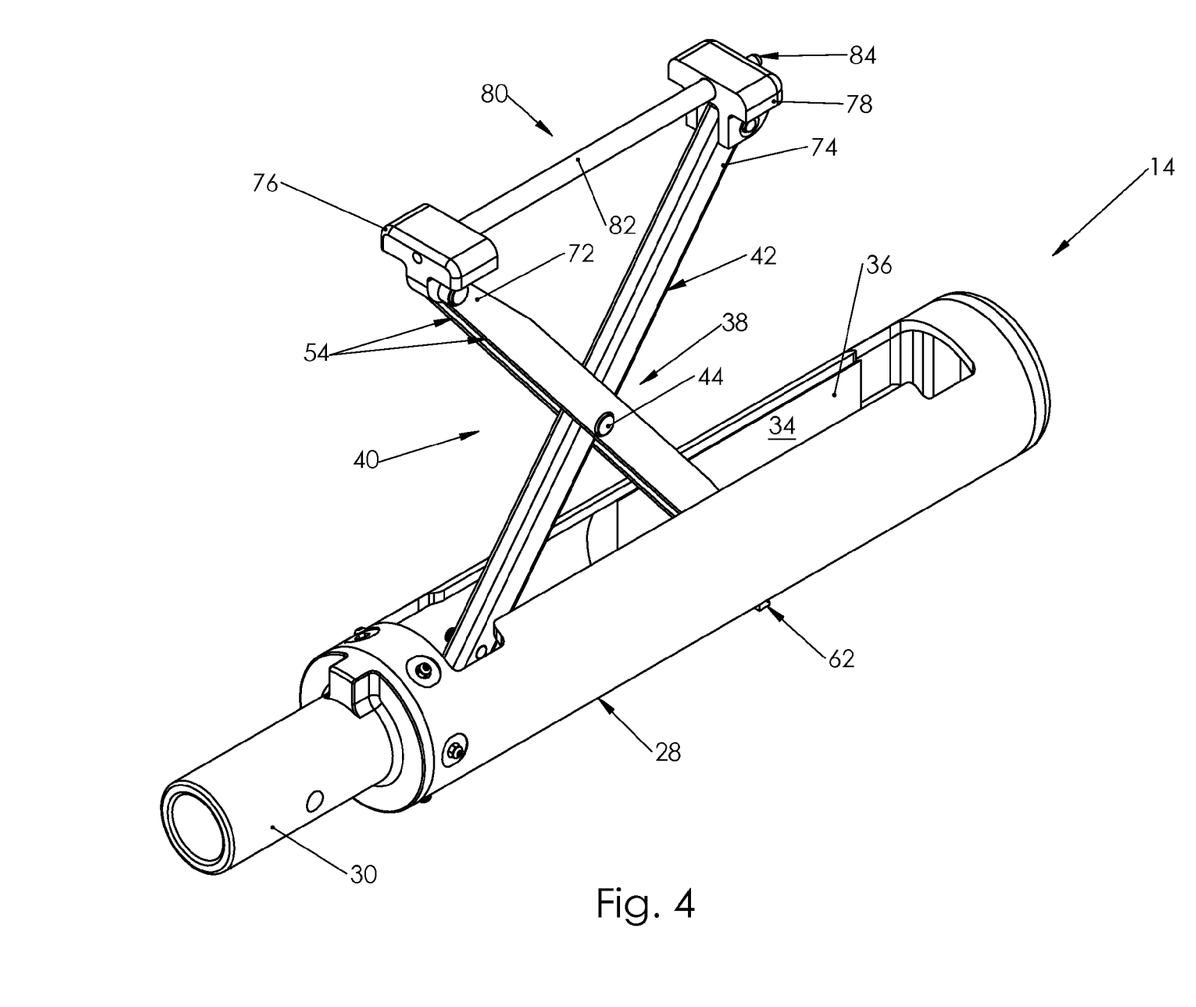
FIG. 4 is an enlarged isometric view of the UAV attachment assembly of FIG. 1 illustrating a scissors-type, vertically retractable UAV support in a vertically extended orientation.
Figure 5:
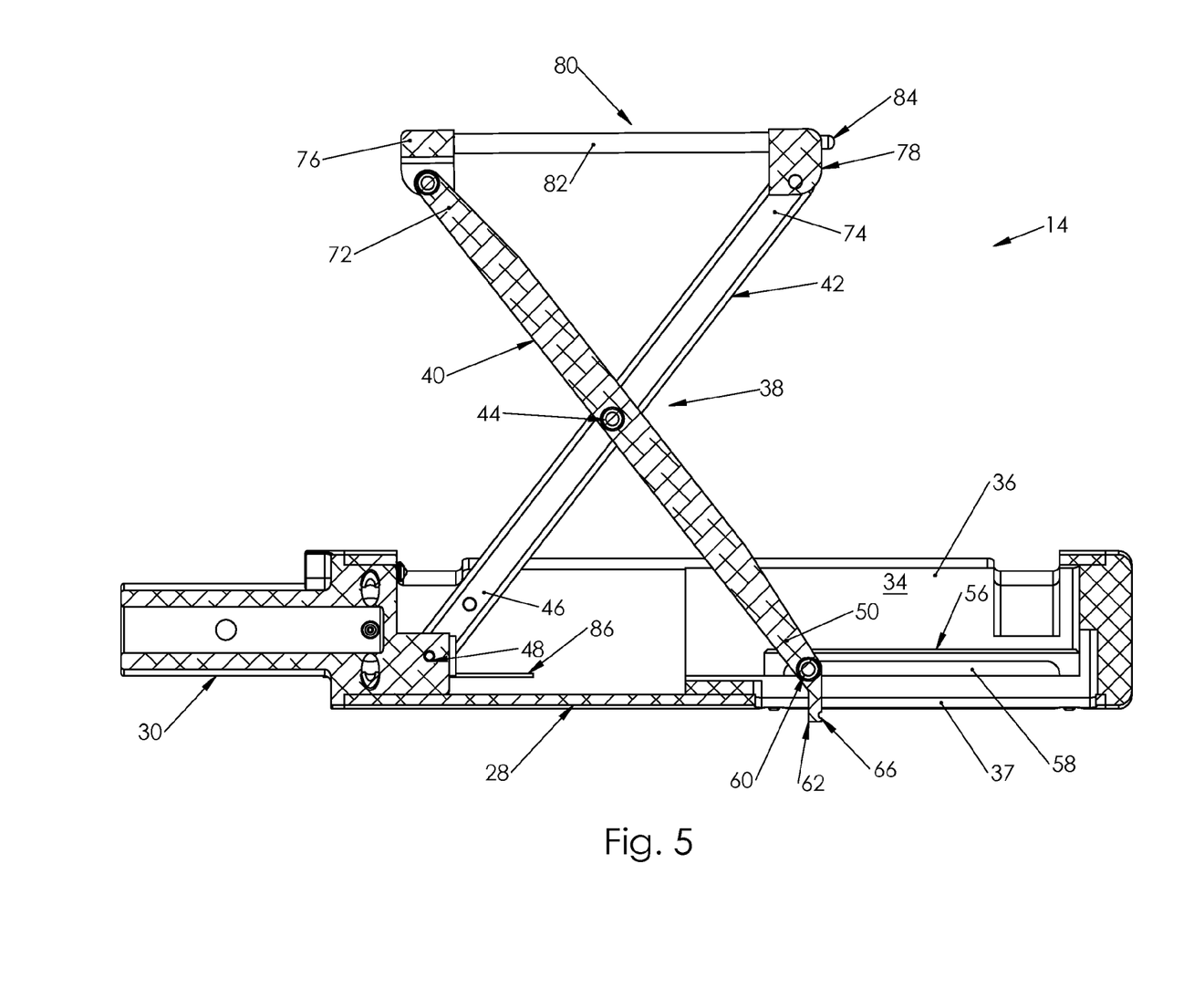
FIG. 5 is a cross-sectional view of the structure of FIG. 4.

Turning now also to FIGS. 2, 4 and 5, UAV attachment assembly 14 includes a base 28. Base 28 includes a tubular extension 30 that fits within and is secured to outer end 26 of pushrod 24. Base 28 acts as a pushrod extension. Base 28 has a hollow interior 34 with a large cutout 36 along its upper portion and a shorter cut out or slot 37 along its lower portion. UAV attachment assembly 14 also includes a scissors-type UAV support 38 including first and second leg 40, 42 pivotally secured to one another along their central portions at a pivot 44. The lower end 46 of second leg 42 is pivotally mounted to base 28 at a pivot 48.

First leg 40 includes a pair of first leg portions 54 which pass on either side of the second leg 42. The first leg portions 54 at the lower end 50 of first leg 40 pass on either side of a guide block 56, the guide block defining a closed end slot 58. A guide pin 60 passes through slot 58 and secures the first leg portions 54 at the lower end 50 of first leg 40 to positions on either side of guide block 56. A hook or finger 62 extends downwardly from guide pin 60 through slot 37 to a position below the lower surface of base 28. Finger 62 has a notch 66 for receipt of a retainer 68, shown in dashed lines in FIG. 1A. Retainer 68 is typically an elastic, stretchable, ruptureable member, such as an O-ring, that also engages a hook 70 at the outer end 32 of outer tube 18 and biases finger 62 rearwardly, that is towards outer tube 18 towards the position of FIG. 5.

Figure 8:
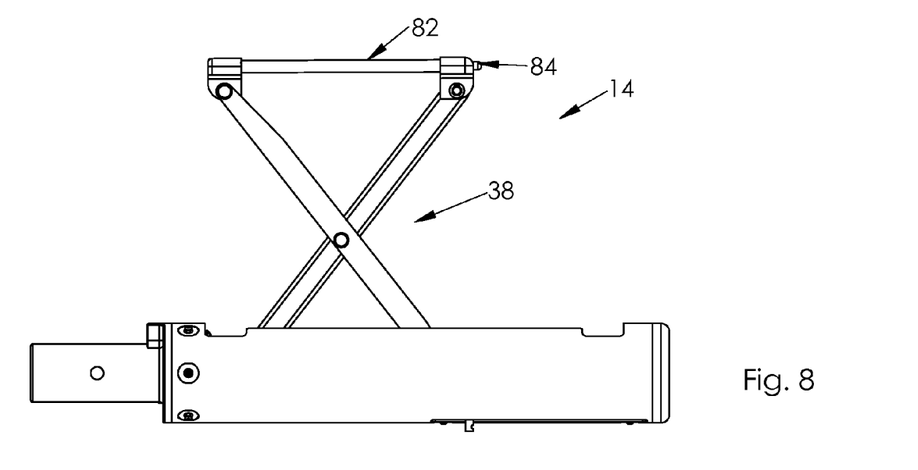
FIGS. 8-10 are three side elevational views of the UAV attachment assembly of FIG. 4 in fully vertically extended, partially vertically extended and vertically collapsed orientations, respectively.
Figure 9:
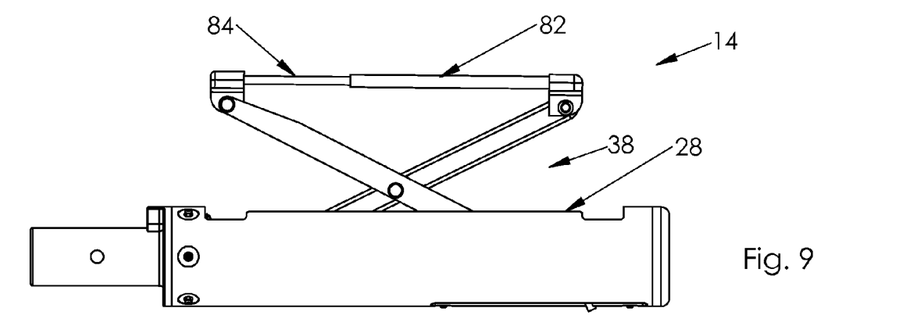
Figure 10:
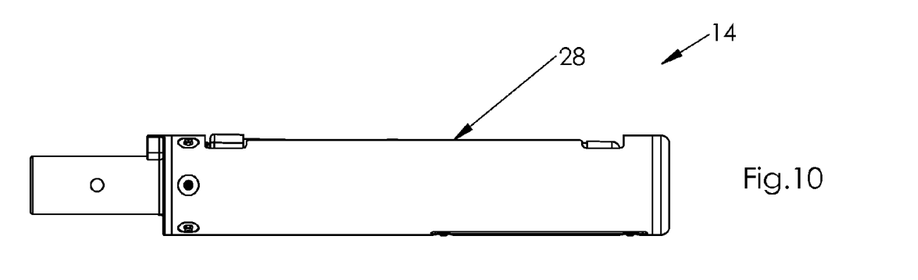

First and second legs 40, 42 have upper ends 72, 74 secured to rear and front guide blocks 76, 78. A telescoping pin and tube assembly 80 is mounted between guide blocks 76, 78 with an outer guide tube 82 secured to and extending from front guide block 78 and an inner skid plate pin 84 secured to and extending from rear guide block 76. A biasing element 86 in the form of a torsion spring engages second leg 42 and base 28 at the lower end 46 of the second leg. Prior to launch, the force of biasing element 86 is resisted by retainer 68. When freed from the restraint of retainer 68, biasing element 86 causes UAV support 38 to move quickly from the vertically extended orientation shown in FIGS. 5 and 8, through a partially extended orientation shown in FIG. 9, and to a vertically collapsed orientation illustrated in FIG. 10. The force of torsion spring 86 is great enough to cause a UAV support 38 to quickly collapse and not be hit by propeller 102 during launch.

Figure 6:
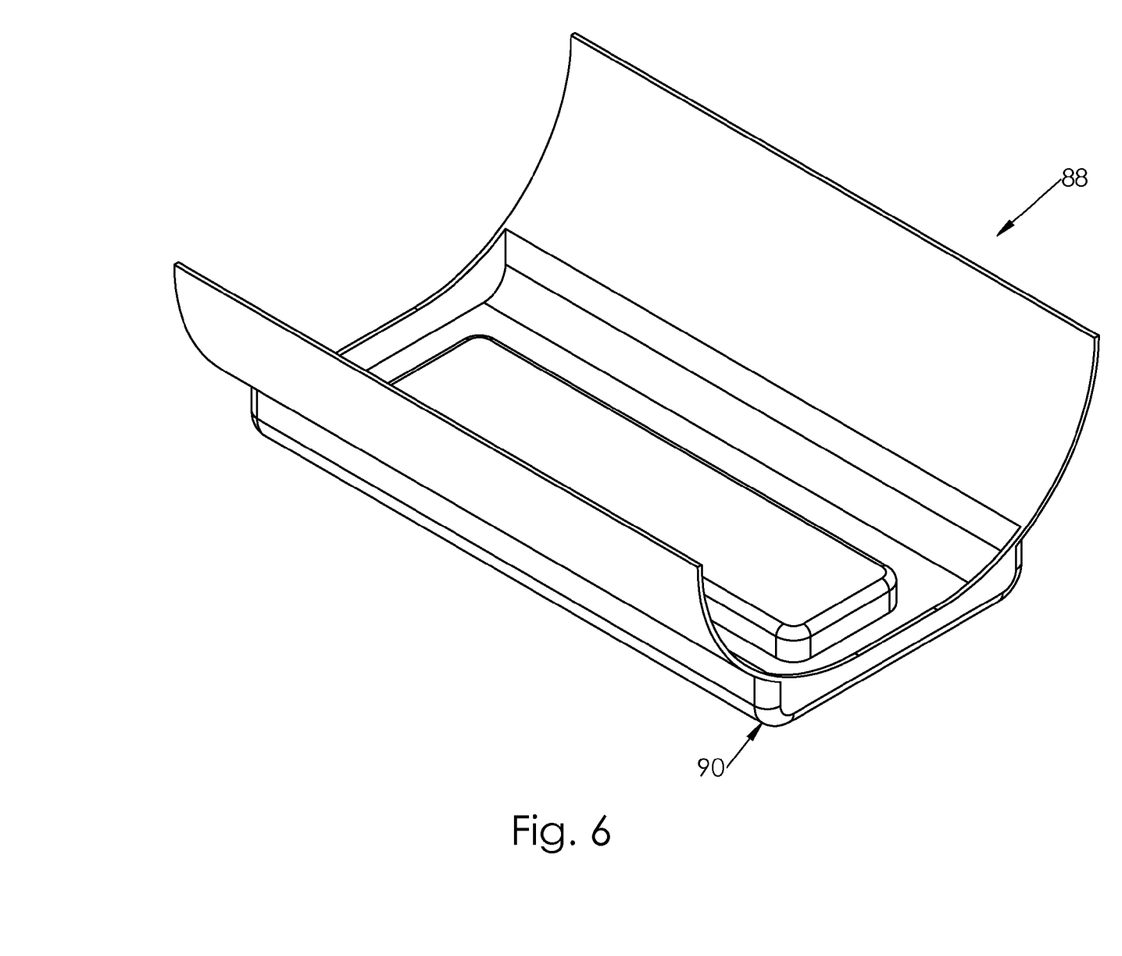
FIGS. 6 and 7 are isometric and cross-sectional views of a lower section of the fuselage of the UAV of FIG. 1 showing the recess for receipt of the guide blocks of the UAV support.
Figure 7:
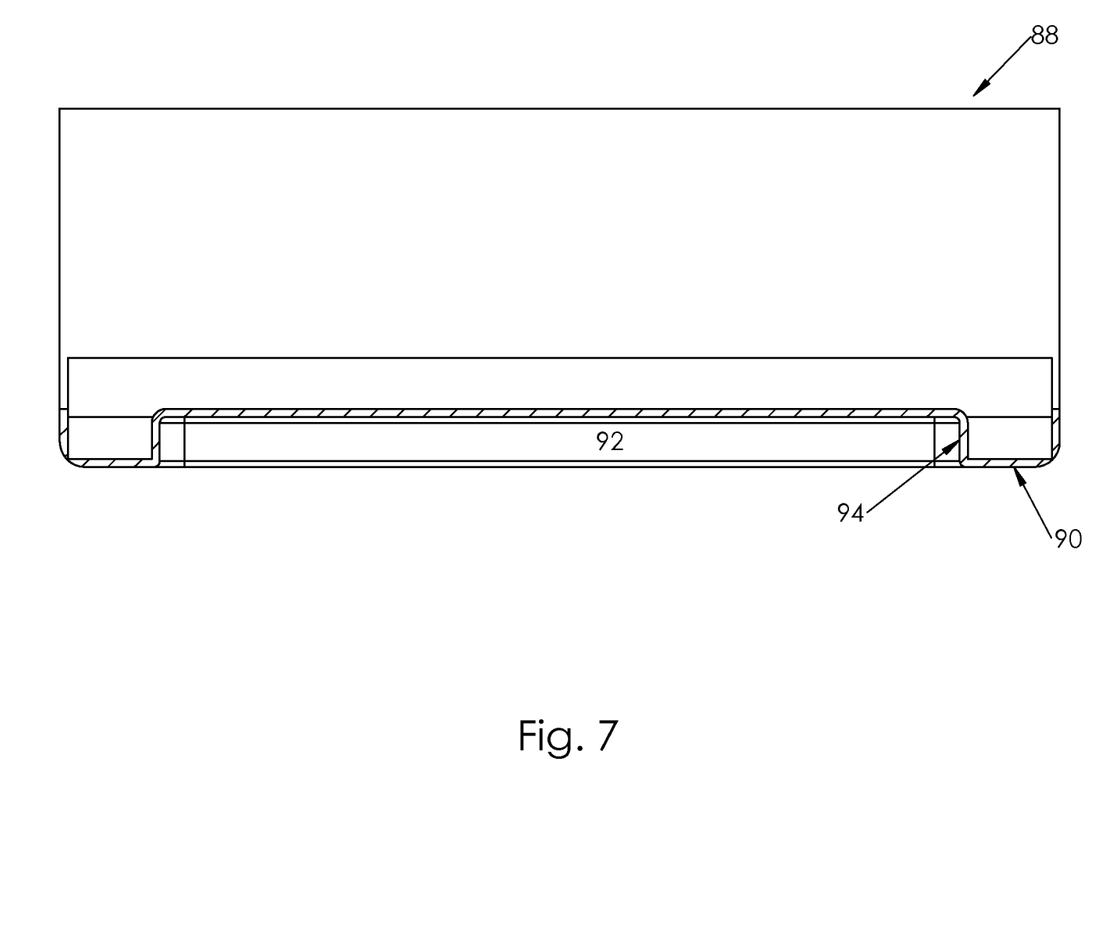

FIGS. 6 and 7 are isometric and cross-sectional views of a lower fuselage section 88 of UAV 16. Fuselage section 88 comprises a skid plate 90 having a recess 92 sized for receipt of the rear and front guide block 76, 78. Guide blocks 76, 78 and recess 92 have complementary shapes to help stabilize the support of UAV 16 provided by UAV support 38. A small hole, not shown but indicated in FIG. 7 at location 94, is formed in skid plate 90 at the front and the recess 92 for receipt of the tip of pin 84. As discussed below, the engagement of pin 84 within the small hole at location 94 helps to prevent the premature disengagement of UAV 16 from UAV support 38 based on the tendency of the UAV to pitch upwardly during launch.

In use, UAV attachment assembly 14 is mounted to the distal end of pushrod 24 of UAV launch assembly 12. Alternatively, launch assembly 12 could be provided with UAV attachment assembly 14 already secured thereto. UAV support 38 is placed in the vertically extended orientation extending away from base 28 against the influence of biasing element 86. UAV support 38 is maintained in the vertically extended orientation through the use of retainer 68 extending between finger 62 and hook 70. A UAV is mounted to UAV support 38 by first placing front guide block 78 into recess 92 in skid plate 90 so that the tip of pin 84 engages the hole at location 94. Then UAV 16 is pivoted downwardly until rear guide block 76 passes into recess 92. Prior to launch, UAV 16 is maintained in the extended orientation. In addition to the stabilization provided by guide block 76, 78 within recess 92, in this example the UAV 16 has a pair of laterally spaced apart tail support members 96 extending from the fuselage 98 and rearwardly of the wing 100 of UAV 16. A tail member 104, having an inverted V-shape in this example, is mounted to the rear ends of tail support members 96. UAV 16 is a push type UAV having a propeller 102 mounted to the rear of fuselage 98, forward of tail member 104 and between tail support members 96. UAV launching assembly 12 has a pair of support guides 106, mounted to and extending upwardly from outer tube 18. Support guides 106 support tail support members 96 prior to launch.

Prior to launch, propeller 102 of UAV 16 is actuated. Launching power is achieved using pressurized air assembly 22 to drive pushrod 24, and UAV attachment assembly 14 and UAV 16 therewith, from outer tube 18. This sequence of events is illustrated in FIGS. 1-3. When pushrod 24 is forced from outer tube 18, retainer 68 is stretched and ruptures. The weight of pushrod 24 causes the back end of the pushrod to pivot downwardly relative to UAV 16 causing rear guide block 76 to disengage from recess 92 followed by the disengagement of pin 84 from the small hole at location 94 of front guide block 78. This permits rear and front guide block 76, 78 to exit recess 92. With the rupture, or other release, of retainer 68, biasing element 86 causes the UAV support 38 to move from the extended orientation of FIGS. 5 and 8 through the partially extended orientation of FIG. 9 to the effectively collapsed orientation of FIG. 10. This all occurs as pushrod 24 and UAV attachment assembly 14 mounted thereto are dropping to the ground. The entire sequence happens very quickly, perhaps in one third of a second, from the initiation of the launch to the complete retraction of UAV support 38. The rapid movement of UAV support 38 to the collapse insures that propeller 102 does not contact UAV support 38 during the launch sequence. As used herein, launch includes generally the sequence of events from initial movement of pushrod 24 from outer tube 18 through the complete disengagement of guide blocks 76, 78 from recess 92 in lower fuselage section 88 of UAV 16.

The above descriptions may have used terms such as above, below, top, bottom, over, under, et cetera. These terms may be used in the description and claims to aid understanding of the invention and not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. For example, UAV support 38 could include two or more pairs of legs 40, 42 with the upper ends of one pair of legs pivotally secured to the lower ends of an adjacent pair of legs. Retainer 68 need not rupture to release from finger 62. Biasing element 86 could be located other than at pivot 48 and could be other than a spring.

Any and all patents, patent applications and printed publications referred to above are incorporated by reference.

What is claimed is:

1. An unmanned aerial vehicle (UAV) attachment assembly, for use with a UAV launch assembly of the type comprising a frame and a launch driver supported by the frame, the launch driver being capable of generating a launching force along a launch path relative to the frame, the UAV attachment assembly comprising:
    a base operably coupled to the launch driver;
    a vertically retractable UAV support mounted to the base and placeable in a vertically collapsed orientation towards the base and a vertically extended orientation extending away from the base;
    a biasing element coupled to the UAV support and biasing the UAV support towards the collapsed orientation;
    a coupler releasably coupling the UAV support to a UAV when the UAV support is in the extended orientation, the UAV support being free of the UAV when in the collapsed orientation; and
    a retainer operably coupled to at least one of the biasing element and the UAV support to maintain the UAV support in the vertically extended orientation prior to launch, and to release the UAV support at launch so that the biasing element can cause the UAV support to move towards the collapsed orientation and to disengage from the UAV.

2. The UAV attachment assembly according to claim 1, wherein the base is secured to a portion of the launch driver.

3. The UAV attachment assembly according to claim 1, wherein:
    the UAV support comprises a scissors assembly, the scissors assembly comprising:
        at least one pair of legs, each pair of legs comprising first and second legs pivotally secured to one another at a pivot point located along the first and second legs;
        the at least one pair of legs having outer ends and base ends, the base ends mounted to the base;
        the at least one pair of legs being movable between the vertically collapsed orientation towards the base and the vertically extended orientation extending away from the base; and
        at least one of the base ends mounted to the base for sliding movement along the base between a first state with the at least one pair of legs in the collapsed orientation, and a second state with the at least one pair of legs in the extended orientation;
    the coupler releasably attaching the outer ends to the UAV when the at least one pair of legs is in the extended orientation, the outer ends being free of the UAV when the at least one pair of legs is in the collapsed orientation; and
    the biasing element is coupled to the at least one pair of legs and biases the at least one pair of legs towards the collapsed orientation.

4. The UAV attachment assembly according to claim 3, wherein the retainer is operably coupled to the biasing element through the at least one pair of legs.

5. The UAV attachment assembly according to claim 3, wherein the retainer comprises a releasable connector coupling the frame to at least one of the outer ends.

6. The UAV attachment assembly according to claim 3, wherein the retainer comprises a ruptureable member.

7. The UAV attachment assembly according to claim 6, wherein at least one of the base ends has a downwardly extending hook finger to which the ruptureable member is engaged so to maintain the UAV support in the vertically extended orientation.

8. The UAV attachment assembly according to claim 3, wherein the coupler comprises a telescoping structure including a pin and a guide member slideably mounted to one another, the pin secured to one of the outer ends and the guide member secured to the other of the outer ends.

9. The UAV attachment assembly according to claim 3, wherein the biasing element comprises a torsion spring engaging the at least one pair of legs and the base.

10. An unmanned aerial vehicle (UAV) launch system comprising:
  a UAV;
  a UAV launch assembly comprising a frame and a launch driver supported by the frame, the launch driver being capable of generating a launching force along a launch path relative to the frame;
  a UAV attachment assembly comprising:
    a base operably coupled to the launch driver;
    first and second legs pivotally secured to one another at a pivot point located along the first and second legs;
    the first and second legs movable about the pivot point between a collapsed orientation towards the base and an extended orientation extending away from the base;
    the first and second legs having outer ends and base ends, the base ends mounted to the base; and
    at least one of the base ends mounted to the base for sliding movement along the base between a first state with the legs in the collapsed orientation, and a second state with the legs in the extended orientation;
  a biasing element coupled to the legs and biasing the legs towards the collapsed orientation;
  a coupler releasably coupling the outer ends of the legs to the UAV when in the extended orientation, the outer ends of the legs being free of the UAV when in the collapsed orientation; and
  a retainer operably coupled to the first and second legs to maintain the first and second legs in the extended orientation prior to launch, and to release the first and second legs upon launch so that the biasing element can cause the legs to move towards the collapsed orientation and to disengage from the UAV.

11. The UAV launch system according to claim 10, wherein the UAV has a lower surface and a recess formed therein for receipt of the outer ends of the legs.

12. The UAV launch system according to claim 11, wherein the lower surface comprises a skid plate.

13. An unmanned aerial vehicle (UAV) launch system comprising:
  a UAV having a fuselage and a push type propeller extending aft of the fuselage;
  a UAV launch assembly comprising a frame and a launch driver supported by the frame, the launch driver comprising an outer tube supported by the frame and an inner pushrod slideably mounted within the outer tube;
  a UAV attachment assembly comprising:
    a base mounted to the pushrod;
    a UAV support mounted to the base, the UAV support comprising a scissors assembly, the scissors assembly comprising:
      at least one pair of legs, each pair of legs comprising first and second legs pivotally secured to one another at a pivot point located along the first and second legs;
      the at least one pair legs having outer ends and base ends; and
      the at least one pair of legs being movable between the vertically collapsed orientation towards the base and the vertically extended orientation extending away from the base;
    the base ends mounted to the base for sliding movement along the base between a first state with the at least one pair of legs in the collapsed orientation, and a second state with the at least one pair of legs in the extended orientation;
    the outer ends being releasably attachable to the UAV when the at least one pair of legs is in the extended orientation;
    the outer ends being free of the UAV when the at least one pair of legs is in the collapsed orientation;
    a biasing element is coupled to the at least one pair of legs and biases the at least one pair of legs towards the collapsed orientation; and
  a retainer operably coupled to the at least one pair of legs to maintain the at least one pair of legs in the extended orientation prior to launch, and to release the at least one pair of legs upon launch so that the biasing element can cause the at least one pair of legs to move towards the collapsed orientation and to disengage from the UAV.

* * * * *